United States Patent [19]

Valanti

[11] 4,048,031

[45] Sept. 13, 1977

[54] METHOD AND APPARATUS FOR PURIFYING EMULSIONS AND CONTAMINATED WATER WITH ELECTOLYSIS

[76] Inventor: Pentti Antero Valanti, 52200, Puumala, Finland

[21] Appl. No.: 634,424

[22] Filed: Nov. 24, 1975

[30] Foreign Application Priority Data

Nov. 26, 1974 Finland .................................. 743404

[51] Int. Cl.² .............................................. C02C 5/12
[52] U.S. Cl. .................................. 204/149; 204/152; 204/275; 204/206; 210/44
[58] Field of Search ............... 204/149, 152, 275, 202, 204/206; 210/44, 186

[56] References Cited

U.S. PATENT DOCUMENTS

| 541,335 | 6/1895 | Salzberger | 204/149 |
|---|---|---|---|
| 1,095,893 | 5/1914 | Landreth | 204/149 |
| 2,399,289 | 4/1946 | Negus | 204/275 |
| 3,920,530 | 11/1975 | Xylander | 204/152 |

*Primary Examiner*—Arthur C. Prescott
*Attorney, Agent, or Firm*—Alfred E. Miller

[57] ABSTRACT

An arrangement is provided for moving at least one aluminum anode with respect to a cathode, to maintain a fixed determined distance between the anode and cathode. An emulsion or contaminated water to be treated is run in the region between the electrodes, and means are provided for preferably running the emulsion or water along the aluminum anode before it reaches the space between the electrodes. The flock is then removed from the resultant flocculated liquid.

15 Claims, 11 Drawing Figures

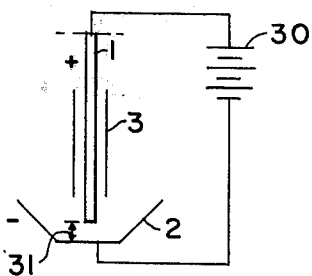
FIG. 1
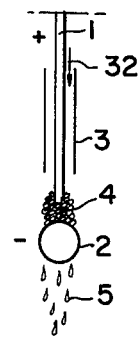
FIG. 2
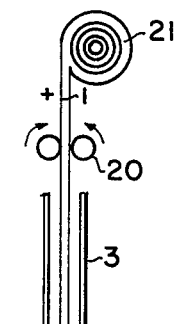
FIG. 5
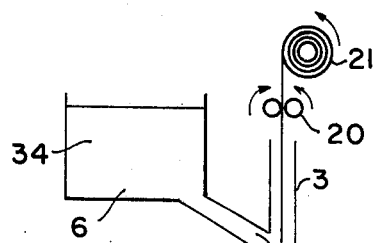
FIG. 3
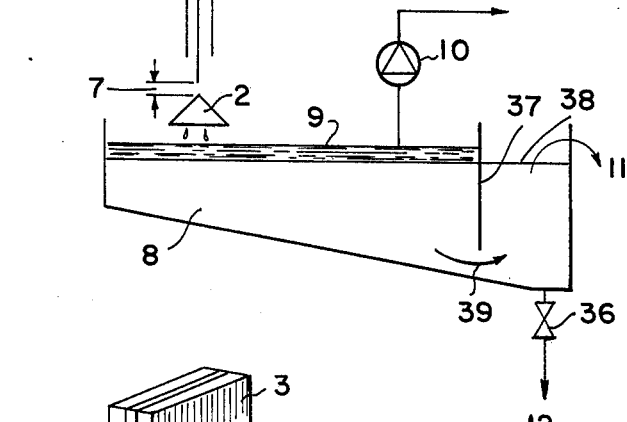
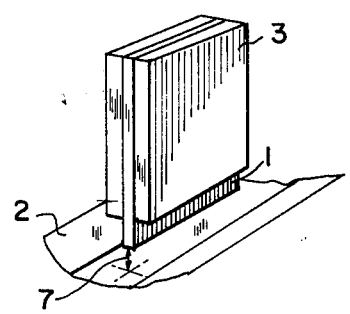
FIG. 4
FIG. 6

METHOD AND APPARATUS FOR PURIFYING EMULSIONS AND CONTAMINATED WATER WITH ELECTOLYSIS

This invention relates to a method and a device for purifying emulsions and contaminated water, especially oil containing water, with the aid of electrolysis.

BACKGROUND OF THE INVENTION

Electrolysis has been employed in the removal of solid particles from liquid. In known techniques, gas bubbles developed by electrolysis rise in the liquid and capture the solid particles and bring them along up to the surface where they are skimmed off in some suitable way. The ability to purify water by such bubbling techniques, however, has been comparatively small due to the fact that the bubbles, in striving to rise upwards linearly strike against the walls of the working vessel and one another, so that the bubbles break and the solid particles are separated from the gas bubbles.

In order to eliminate these drawbacks the applicant has proposed forming an aluminum anode by using aluminum flock which is circulated in the material being purified, in order to absorb the impurities in the material, while rising to the surface for removal in ordinary manner.

The present invention is directed to the provision of a method and apparatus which has been found to considerably improve the latter method, while reducing power consumption per unit volume of purified liquid. According to the invention one or more aluminum electrodes are kept at a given distance from the negative pole, and the emulsion being treated, or the water, is run into or near the space between the electrodes to contact these electrodes. The flock resulting from this treatment is then separated in a known manner. The electrodes are kept just a few millimeters from one another, the aluminum anode preferably being above the cathode, so that it extends end to end with or forms an angle with the cathode. In accordance with the invention it is desired to obtain an electric flow path which is narrow or small in cross-section with correspondingly stronger flow. This is accomplished, for instance, by using one or more thread-like aluminum anodes which are situated at right angles or obliquely with respect to the cathode, the latter of which suitably is made of stainless steel into the form of a flute, plane, rotating roller or a plate, an endless band or the like. The anode may be fed in many different ways such as, for instance, by the power of its own weight, or by means of a mechanical device such as drawing wheels engaging it. The distance from the anode to the cathode may be regulated simply by fitting an insulating member between them, which the anode is directed to strike. The anode can also be fed according to a given program, or by using suitable feeler members for measuring the distance between the parts and a suitable mechanism in between for keeping to a program for feed advance of the anode.

The material being purified is run at least some distance in contact with the electrode before arriving to the space between the electrodes. This may be accomplished simply by flowing the material to be purified from its storage tank in an electrode guiding member which may be, for instance, a pipe, an inclined surface, a flute, or the like. The material to be purified may also be directed from one or more nozzles into the space between the electrodes.

The electrodes are preferably coupled to a low-tension direct-current source of 12 volts, for instance. A suitable current strength is for example 1.5-2 ampere. By using suitable electrodes and an electrode distance of a few millimeters a power consumption of nearly half a watt per liter material to be purified has been attained in tests. This is only a fraction of the energy previously needed for corresponding purification. In the process according to the invention a very strong foaming action is observed at the electrodes, with plenty of flock and hydrogen development. If the electrode gap is located in the air space, one can actually see the flocks and the droplets of clear pure water dropping from the reaction place.

In order that the invention will be more clearly understood, it will now be disclosed in greater detail with reference to the accompanying drawings, wherein:

FIG. 1 is a simplified illustration explaining the principle of operation of the present invention;

FIG. 2 illustrates a modification of the arrangement of FIG. 1, and showing foaming at the electrodes;

FIG. 3 is a schematic illustration of one method and process in accordance with the invention;

FIG. 4 is a perspective illustration of one form of electrodes, in accordance with the invention;

FIG. 5 is a partially cross-sectional view of a further embodiment of the invention;

FIG. 6 is a partially cross-sectional view of a still further embodiment of the invention;

Figure 7:
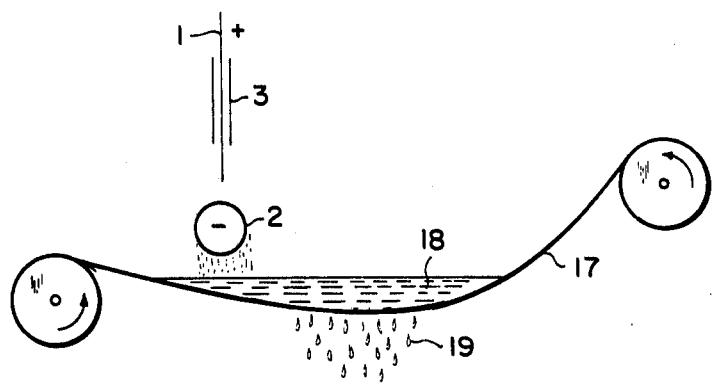
FIG. 7 is a simplified illustration of another embodiment of the invention.

In the figures the aluminum anode (or anodes) is designated by the symbol 1 and the cathode by the symbol 2, while the anode guiding member is 3. In FIG. 2 the designation 4 indicates a large degree of foaming in the electrode space 7. In the same figure dropping water and flock droplets is indicated by 5.

DESCRIPTION OF THE PREFERRED EMBODIMENT OF THE INVENTION

Referring now to FIG. 1, which illustrates in schematic form the principle of the present invention, a suitable electric source 30 is connected between the anode 1 and the cathode 2. The lower end of the anode 1 extends a pre-determined distance 31 from the surface of the cathode electrode, which in this case is trough shaped. The anode guiding member 3, which may be tubular, surrounds and guides the anode 1, Suitable means, not shown in FIG. 1, are provided for feeding the aluminum anode toward the cathode, in order to maintain the pre-determined distance 31.

As illustrated in FIG. 2, when water to be purified is passed downwardly through the tube 3, as indicated by the arrow 32, a foaming action as indicated at 4 results in the interelectrode space, with the result that water and flock drops from the cathode tube, as indicated at 5. In this instance, the cathode is shown as round. It is to be noted that the aluminum flock is produced as a result of the electric current, so that the aluminum anode must be moved relative to the cathode, to maintain the production of the flock.

FIG. 3 shows how the emulsion to be treated or the water 34 may be conducted from tank 6 into the anode guiding pipe 3, inside of which the anode is fed from a roll 21 towards a conical cathode 2. From here the water and the flock drop into the water space of a basin 8, where the flock 9 remains floating on the surface and is sucked off from here in the usual way by the pump 10 extending only into the layer of flock. The flock carries with it the contaminants.

The basin 8 is provided with a barrier 37 at the surface thereof, so that an area 38 of the surface of the liquid is separated from the area containing the flock 9. Purified liquid may hence flow under the barrier 37, as indicated by the arrow 39. The purified water may thereby be removed from the region 38 of the basin 8 as indicated by the arrow 11.

Possible precipitate is discharged through point 12 by way of valve 36.

FIG. 4 shows a plate-like anode 1 and its correspondingly shaped guiding member 3, as well as the flute-like cathode 2 of stainless steel. The electrodes are also here at a distance 7 preferably of a few millimeters from one another.

According to FIG. 5 the cathode 2 is located on the extension 2 of the pipe 3, which serves as a guiding member for the electrode 1 and the liquid being treated. A suitable electrode gap is provided by insulating guiding pieces 15. Also in this case the anode is fed from the roll 21 with the aid of drawing cylinders 20 for feeding the anode. The anode is arranged to strike the insulator 14 which is situated in the basin 13, while the purified water and the flock are able to flow over the edges of the basin in a manner known as such for further treatment. In this arrangement the guide pipe 3 may be of an insulating material.

FIG. 6 shows an arrangement of the above kind, but in this case the anode 1 strikes the insulator 14, which is mounted for rotation with a rotating cathode plate 2, for providing a suitable anode distance. The rotating plate is suitably surrounded by a basin 16.

FIG. 7 shows an arrangement of the above kind where, below the cathode 2, an endless band 17 is situated, through which the purified water 19 drops, while the flock moves along with the band from the basin 18. The band 17 may be of any conventional material pervious to water.

Figure 8:
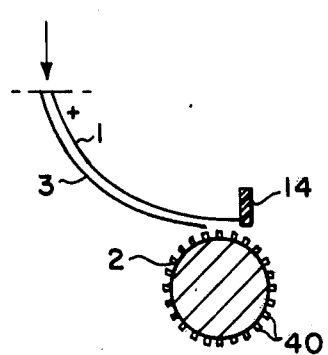
FIG. 8 is a simplified illustration of a still further embodiment of the invention.
Figure 9:
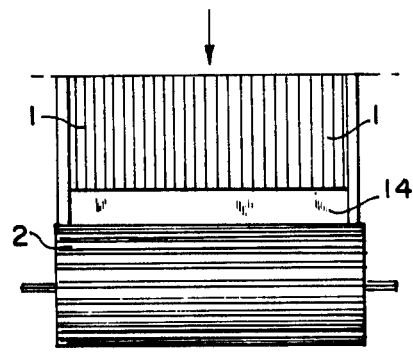
FIG. 9 is a front view of the arrangement of FIG. 8.
Figure 10:
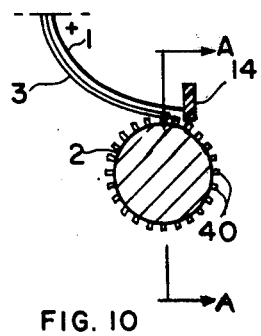
FIG. 10 is a cross-sectional view of the arrangement of FIG. 8.
Figure 11:
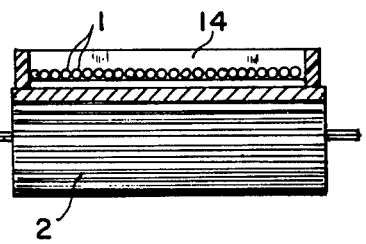
FIG. 11 is a cross-sectional view of the arrangement of FIG. 8, taken along the lines A-A of FIG. 10.

FIG. 8 shows the side of a rotating cathode roller 2 provided with ribs 40, while to its peripheral surface along a guiding flute 3 a mat made up of anode threads 1 is conducted. The threads strike an insulator 14 positioned above the cathode, thereby maintains a suitable electrode distance to the cathode 2. FIG. 9 shows the same device from the front, FIG. 10 shows a cross-section of the same device, and FIG. 11 shows a cross-section of the same device taken along the lines A—A of FIG. 10.

While the invention has been disclosed and described with reference to a limited number of embodiments, it will be apparent that variations and modifications may be made therein, and it is intended in the following claims to cover each such variation and modification as falls within the true spirit and scope of the invention.

What is claimed is:

1. A method for purifying emulsions and contaminated water, such as water containing oil, with electrolysis, comprising maintaining at least one aluminum anode a determined distance from a cathode with said anode and cathode both being above a vessel, and treating the emulsion or contaminated water by running it into the space between the anode and the cathode to contact these electrodes, whereby flock is produced and said flock and water drop into said vessel, and then separating the flock from the thereby flocculated emulsion or water.

2. The method of claim 1 wherein said step of maintaining said aluminum anode a determined distance from said cathode comprises maintaining said distance constant.

3. The method of claim 1 wherein said step of maintaining said anode a determined distance comprises regulating the distance between said anode and cathode according to a pre-determined program.

4. The method of claim 1 comprising flowing said emulsion or contaminated water along said anode before it is run into the space between the anode and cathode.

5. The method of claim 1 wherein said step of maintaining said anode a distance from said cathode comprises maintaining said anode above said cathode.

6. The method of claim 1 wherein said step of maintaining said anode a determined distance from said cathode comprises feeding an aluminum anode in the form of a thread toward said cathode.

7. The method of claim 1 wherein said cathode is of stainless steel, in the form of a plate.

8. The method of claim 1 wherein said cathode is stationary.

9. The method of claim 1 comprising rotating said cathode.

10. The method of claim 1 wherein said step of maintaining said distance comprises directing said anode against an insulating plate on said cathode.

11. The method of claim 1 comprising regulating said distance in accordance with the flow density of the material being treated.

12. The method of claim 1 comprising regulating said distance in accordance with the amount of liquid being treated.

13. The method of claim 1 comprising applying a low voltage direct current to said anode and cathode to cause a flow therebetween of the order of 1 ampere, whereby the electric consumption is below 1 Watt per liter of liquid being treated.

14. The method of claim 1 wherein said step of maintaining said anode a determined distance from said cathode comprises feeding an aluminum anode in the form of a plate toward said cathode.

15. The method of claim 1 wherein said cathode is of stainless steel in the form of a drum.

* * * * *